(12) United States Patent
Biland et al.

(10) Patent No.: US 10,369,754 B2
(45) Date of Patent: Aug. 6, 2019

(54) COMPOSITE FIBERS AND METHOD OF PRODUCING FIBERS

(71) Applicants: Oleksandr Biland, Richmond, TX (US); Robert Ferguson, Richmond, TX (US)

(72) Inventors: Oleksandr Biland, Richmond, TX (US); Robert Ferguson, Richmond, TX (US)

(*) Notice: Subject to any disclaimer, the term of this patent is extended or adjusted under 35 U.S.C. 154(b) by 280 days.

(21) Appl. No.: 15/424,538

(22) Filed: Feb. 3, 2017

(65) Prior Publication Data

US 2018/0222132 A1     Aug. 9, 2018

(51) Int. Cl.
| | |
|---|---|
| *B29C 53/14* | (2006.01) |
| *B29C 70/52* | (2006.01) |
| *B29C 70/54* | (2006.01) |
| *D01H 13/30* | (2006.01) |
| *B29K 105/10* | (2006.01) |
| *B29K 309/08* | (2006.01) |
| *B29K 309/10* | (2006.01) |

(52) U.S. Cl.
CPC .......... *B29C 70/523* (2013.01); *B29C 70/522* (2013.01); *B29C 70/524* (2013.01); *B29C 70/527* (2013.01); *B29C 70/545* (2013.01); *B29C 53/14* (2013.01); *B29K 2105/10* (2013.01); *B29K 2309/08* (2013.01); *B29K 2309/10* (2013.01); *D01H 13/30* (2013.01); *D01H 13/302* (2013.01); *D01H 13/304* (2013.01); *D01H 13/306* (2013.01)

(58) Field of Classification Search
CPC ................ B29C 70/522; B29C 70/524; B29C 70/52–528; B29C 70/523; B29C 70/545; B29C 70/527; B29C 53/14; B29K 2105/10; B29K 2309/08; B29K 2309/10; D01H 13/30; D01H 13/302; D01H 13/304; D01H 13/306

See application file for complete search history.

(56) References Cited

U.S. PATENT DOCUMENTS

| | | | | |
|---|---|---|---|---|
| 2,730,455 | A * | 1/1956 | Swann | C03C 25/26 118/123 |
| 3,235,429 | A * | 2/1966 | Boggs | B29C 53/60 156/166 |
| 3,437,537 | A * | 4/1969 | Takada | F16L 9/12 156/149 |
| 3,895,896 | A | 7/1975 | White et al. | |

(Continued)

FOREIGN PATENT DOCUMENTS

| | | |
|---|---|---|
| CN | 202543025 | 11/2012 |
| CN | 202808558 | 3/2013 |

(Continued)

OTHER PUBLICATIONS

U.S. Appl. No. 62/350,832, filed May 22, 2001, Kepplinger et al.

(Continued)

*Primary Examiner* — Jeffrey M Wollschlager
(74) *Attorney, Agent, or Firm* — Vinson & Elkins LLP (57) ABSTRACT

Composite fibers created by a process including vertically texturizing and impregnating resin into the fibers at controlled viscosity results in stronger fibers in which virtually no microbubbles are trapped resulting in improved tensile strength for use in reinforcing concrete and other materials.

29 Claims, 5 Drawing Sheets

(56) References Cited

U.S. PATENT DOCUMENTS

| | | | |
|---|---|---|---|
| 4,194,873 A | 3/1980 | Killmeyer | |
| 4,289,465 A | 9/1981 | Killmeyer et al. | |
| 4,296,060 A | 10/1981 | Killmeyer et al. | |
| 4,565,153 A * | 1/1986 | Corley | B29B 15/122 118/405 |
| 4,624,102 A * | 11/1986 | Bell, Jr. | D01F 11/14 423/447.1 |
| 4,720,295 A | 1/1988 | Bronshtein | |
| 4,752,513 A | 6/1988 | Rau et al. | |
| 4,938,823 A | 7/1990 | Balazek et al. | |
| 5,176,775 A * | 1/1993 | Montsinger | B29B 15/122 118/123 |
| 5,447,793 A * | 9/1995 | Montsinger | B29C 70/50 118/110 |
| 5,468,327 A * | 11/1995 | Pawlowicz | B29B 15/122 156/393 |
| 5,725,954 A * | 3/1998 | Montsinger | B29B 15/122 428/357 |
| 5,891,284 A * | 4/1999 | Woodside | B29C 70/16 156/148 |
| 6,647,747 B1 | 11/2003 | Brik | |
| 6,800,164 B2 | 10/2004 | Brandstrom | |
| 6,893,524 B2 | 5/2005 | Green | |
| 7,045,210 B2 * | 5/2006 | Bleibler | B29C 53/14 428/367 |
| 7,530,240 B2 | 5/2009 | Kibol | |
| 8,037,719 B2 | 10/2011 | Kamiya et al. | |
| 8,042,362 B2 | 10/2011 | Kibol et al. | |
| 8,043,982 B2 * | 10/2011 | Telander | B32B 5/16 428/911 |
| 8,123,887 B2 | 2/2012 | Green | |
| 8,147,635 B2 * | 4/2012 | Tashiro | B29B 9/14 156/148 |
| 8,414,807 B2 | 4/2013 | Kibol et al. | |
| 8,709,586 B2 * | 4/2014 | Yano | B29B 9/14 428/297.4 |
| 8,806,900 B2 | 8/2014 | Brik | |
| 8,910,690 B2 | 12/2014 | Tashiro et al. | |
| 9,211,654 B2 * | 12/2015 | Tashiro | B29B 9/14 |
| 9,688,030 B2 * | 6/2017 | Kiilunen | B29C 70/521 |
| 2005/0103058 A1 | 5/2005 | Gogoladze et al. | |
| 2005/0223752 A1 | 10/2005 | Kibol | |
| 2006/0218972 A1 | 10/2006 | Brik | |
| 2006/0278176 A1 | 12/2006 | Chigirnskaya et al. | |
| 2007/0000721 A1 | 1/2007 | Kamiya et al. | |
| 2008/0179779 A1 | 7/2008 | Kibol et al. | |
| 2012/0104306 A1 | 5/2012 | Kamiya et al. | |
| 2013/0239503 A1 * | 9/2013 | Miller | C04B 20/0068 52/414 |
| 2014/0366347 A1 * | 12/2014 | Miura | D03D 1/00 28/169 |
| 2015/0204075 A1 * | 7/2015 | Tsukamoto | B29C 35/0805 52/309.1 |
| 2016/0089820 A1 * | 3/2016 | Schinkinger | B29C 70/521 264/172.11 |
| 2016/0184777 A1 * | 6/2016 | Cote | B01D 69/085 210/500.23 |
| 2017/0145627 A1 * | 5/2017 | Sakurai | D06M 15/59 |
| 2017/0342654 A1 * | 11/2017 | Okamura | C04B 28/02 |
| 2018/0311915 A1 * | 11/2018 | Mukherji | B29C 70/521 |

FOREIGN PATENT DOCUMENTS

| | | |
|---|---|---|
| CN | 103043897 | 4/2013 |
| CN | 202849233 | 4/2013 |
| CN | 203033871 | 7/2013 |
| CN | 203256109 | 10/2013 |
| CN | 203397236 | 1/2014 |
| CN | 203429057 | 2/2014 |
| CN | 203960029 | 11/2014 |
| CN | 104211296 | 12/2014 |
| CN | 104291551 | 1/2015 |
| CN | 204079775 | 1/2015 |
| CN | 204097308 | 1/2015 |
| CN | 204097326 | 1/2015 |
| CN | 204097327 | 1/2015 |
| UA | 88150 | 3/2014 |

OTHER PUBLICATIONS

Lowenstein, "Manufacturing Technology of Continuous Glass Fibers," Elsevier Science Publishers B.V. 1983 ( chp. 4).

International Search Report and Written Opinion, PCT/US2017/037718, dated Aug. 23, 2017.

International Search Report, PCT/US2018/016221, dated Mar. 6, 2018.

* cited by examiner

COMPOSITE FIBERS AND METHOD OF PRODUCING FIBERS

BACKGROUND

Figure 2:
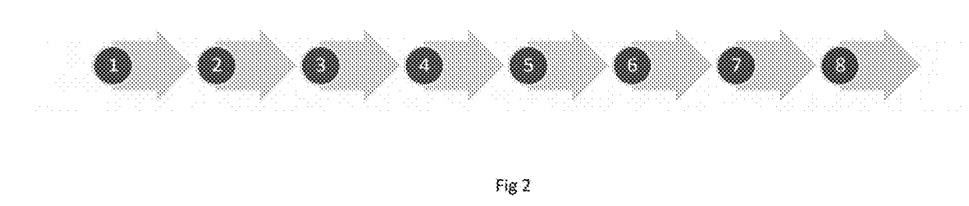
FIG. 2 is a flow diagram of a conventional pultrusion process in which all steps are practiced in a horizontal orientation.

Pultrusion is a continuous process for the manufacturing of composite materials with a constant cross-section, and is a commonly used method in the production of composite fibers. A typical pultrusion process flow diagram in which the steps are practiced horizontally is represented by FIG. 2. In the standard pultrusion process the reinforcement materials like fibers or braided strands (1) are pulled horizontally through creel guide and tension rollers (2), then fiber strands are impregnated with resin (3), possibly followed by a separate preforming system, and pulled through a heated stationary die (4) where the resin undergoes polymerization. The impregnation is either done by pulling the reinforcement through a bath or by injecting the resin into an injection chamber which typically is connected to a die. Next, the impregnated fiber is pulled through a surface shaping station (5) and cured inside a preheated curing chamber (6). Linear horizontal movement of the pultruded member is provided by a pull mechanism (7). In a final stage the pultruded member is cut to required lengths at cutting station (8).

Some known pultrusion processes include those described in the following U.S. Patents, including U.S. Pat. No. 3,895,896; in which articles are made by folding ribbons of fiber mat while dry, over and around one or more mandrels having an exterior configuration which delineates a hollow cavity, or cavities, extending longitudinally through the article. U.S. Pat. No. 4,194,873, describes a fiber reinforced pultruded rod-like reinforcing element that includes at least one groove and/or protrusion along its length, with the continuous reinforcing fibers in the protrusion or surrounding the groove generally conforming to the pattern of the outer surface of the rod in a helical pattern. U.S. Pat. No. 4,289,465 and divisional patent U.S. Pat. No. 4,296,060, describe processes in which twisted pultruded fiber reinforced rods are formed. In forming the rods, fibers are coated with a resin, drawn through a shaping die and then after at least partially curing, the rod is simultaneously twisted and pulled through a coater by opposed pulling surfaces that rotate as they pull to twist the rod. U.S. Pat. No. 4,938,823 describes a method for the manufacture of fiber reinforced plastic articles including the steps of pultruding a first profile through a die and applying a thermoplastic resin to the first profile to form a second profile bonded integrally to the first profile. U.S. Pat. No. 4,752,513 describes resin reinforcing composite mats of continuous strands for use in pultrusion processes. The pultruded parts are characterized by having a reinforcement of mats and rovings with the reinforcing mats and rovings being distributed throughout the parts. U.S. Pat. No. 6,800,164 describes composite reinforcing rods formed by using a mandrel or plastic tubing core to form a hollow shape of the composite materials to get an externally threaded composite tubing. U.S. Pat. No. 6,893,524 describes a method including wetting fibers with a resin capable of being cured by at least two different cure treatments, and at least partially curing the resin by subjecting the resin to a first curing treatment and at least partially curing the resin by subjecting the resin to a second curing treatment. A plurality of fibers are located adjacent to each other so that a plurality of valleys are formed between the plurality of fibers along an outer side of the reinforcement. The resin is cured to retain the valleys in the outer side of the reinforcement. U.S. Pat. No. 8,123,887 describes a continuous method for making oriented fiber composites for use in thin materials. Each of U.S. Pat. Nos. 3,895,896, 4,194,873, 4,289,465, 4,296,060, 4,938,823, 4,752,513, 6,800,164, 6,893,524, and 8,123,887 discussed above is incorporated herein by reference in its entirety.

Figure 1A:
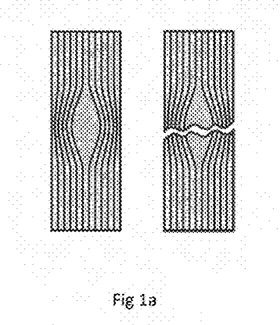
FIG. 1A is an illustration of the weakening and breakage of conventionally pultruded fiber reinforced products due to microbubbles in the fibers.
Figure 1B:
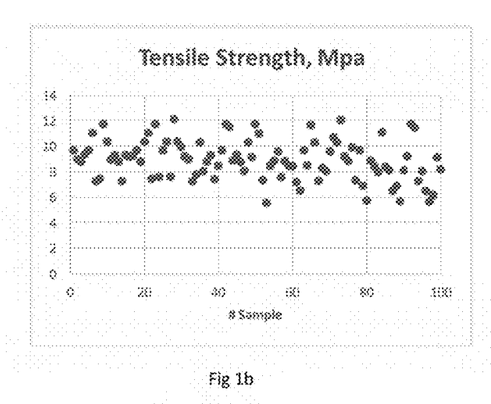
FIG. 1B is a graph of tensile strength of 100 samples of conventionally pultruded basalt fiber from a single batch.

None of these references address the problems discovered by the present inventors and addressed in this disclosure. Tensile testing of composite fibers from different manufacturers revealed that breaking loads for fibers, even those within the same batch, may vary by more than a factor of 2 as shown in FIG. 1B. It can be seen in FIG. 1B, for example, that a tensile test of one hundred samples from the same batch exhibited an average tensile strength of the fibers of about 256.8 ksi (kilopounds per square inch) with a variability of about 37% above and below the average line. Similarly tested steel fibers did not exhibit this variability. Although basalt fibers, for example, offer certain advantages over steel reinforced concrete, concrete reinforce with conventionally produced composite fibers may be more prone to cracking because of the variability in the tensile strength of the composite fibers.

A careful study of each stage of the pultrusion process revealed the occurrence of a large number of gas microbubbles arising at the stage of impregnation of the fiber strands with resin. Fiber strands are composed of thousands of filaments coated with sizing film. Sizing film is well known term in the art and can be described as a sprayed film that is applied to filaments as they are formed leaving a die, for example. Sizing typically includes a film forming agent such as a silane and a coupling agent, although many more complex chemistries can be used for certain products. The purpose of the sizing is to protect and lubricate the fibers and to hold the fibers together. Images of filaments taken by a Scanning Electron Microscope show that the sizing film for conventionally produced fibers is not flawless, the filaments' surfaces are uneven and heterogeneous. Molecules of gases are very easily entrained by these surface irregularities and are present within the bundle of strands when added to a resin bath. As the fiber bundles are submerged in the resin the gas molecules remain trapped inside the bundle. None of the further actions that are typical of pultrusion processes such as heating, squeezing, curing, etc. can remove these gas bubbles from the fibers. The viscosity of the resin is so high that the gas bubbles remain in the pultruded member in its finished form. These trapped gas bubbles result in a weakening of the mechanical strength of the pultruded member.

Therefore, there remains a need for systems and methods that allow continuous production of uniform composite fibers without irregularities in the form of trapped gas bubbles or microbubbles.

SUMMARY

The present disclosure is related to the field of composite fibers for structural reinforcement of various construction or industrial materials such as concretes, mortars, soil stabilizing polymers, geo-polymers, asphalts etc. Currently composite fibers made of mineral or glass fibers (especially fiberglass and basalt fibers) and thermoset resins have gained more and more popularity in the construction market. These fibers are relatively cheap, have good mechanical properties, are non-corrosive, are lighter than steel, can have longer lifetimes and are easier to cut and to apply. Despite the fact that such composite fibers easily compete with commonly used polypropylene fibers, they still cannot completely substitute for steel fibers due to their weaker structural properties. The problem is that composite fibers, even fibers from the same processing batch, exhibit highly variable mechanical properties that negatively impact the structural characteristics of reinforced concrete or other material containing those fibers. Scanning Electron Microscopic examination of the shape, size, texture and phase distribution of the composite fibers tested by the inventors revealed a large number of unevenly distributed gas microbubbles between the filaments inside a set resin as shown in FIG. 1A. Furthermore, the microbubbles cause stress points in the composite fibers causing them to break in locations of maximum accumulation of microbubbles. Moreover exfoliation of filaments and their poor adhesion to the resin are clearly visible in the locations of breakage. The current disclosure addresses this problem by providing methods and apparatus that keep composite structural reinforcement fibers free from gas bubbles during the process of manufacturing.

The present disclosure can be described, therefore, in certain embodiments as methods of producing composite fibers that are suitable to be cut into short lengths and blended into materials such as concrete, for example, as structural reinforcement. The fibers can be inorganic and/or composed of various materials such as, but not limited to igneous rock such as mixtures of any of feldspars, quartz, feldspathoids, olivines, pyroxenes, amphiboles, and micas, or combinations thereof, and in certain embodiments the fibers can be composed of any of basalt, carbon fibers, aramid, para-aramid or meta-aramid fibers such as used in Kevlar®, Nomex® and related products, or glass fibers, or combinations of any thereof In certain embodiments the fibers are igneous rock melt comprising basalt in which the fibers are produced as described in co-pending U.S. Provisional Application Ser. No. 62/350,832, filed Jun. 16, 2016, which is incorporated herein in its entirety by reference for all purposes.

In certain embodiments the methods include feeding fiber strands vertically down through a texturizer, effective to separate individual filaments of the strand, and to inhibit the fibers sticking together, wherein the texturized fibers are unstrained. The unstrained texturized fibers are then fed vertically down through a resin impregnation device, wherein the device functions as a resin impregnation, degassing and tensioning device. Many resin types may be used in pultrusion including polyester, polyurethane, vinyl-ester and epoxy. Resin provides resistance to the environment, (i.e., corrosion resistance, UV resistance, impact resistance, etc.) and the glass or composite provides strength.

In certain embodiments the resin is injected into the device at a viscosity of 5 mPa*S or less, for example, or about 1, 2, 3, 4, or 5 mPa*S, and the plurality of fibers is rotated effective to twist all the fibers into a single bundle where the twisting point is below the level of resin in the device, allowing at least a portion of any trapped gases to rise to the surface of the resin. The bundle can be rotated in the device effective to achieve a configuration of from about 1 to about 50 plies per inch, or from about 3 to about 35 plies per inch, or from about 5 to about 25 plies per inch, and squeezed with squeezing rollers inside the device effective to further release any trapped gas and allow the released gas to rise to the surface of the resin. In certain embodiments the bundled fibers are pulled from the bottom of the device through tensioning rollers, and pulled into a first curing station to obtain a partially cured bundle. The bundles can then be pulled through shaping grips that pull the bundle from the first curing station, impart a shape to the bundle and push the bundle without tension out of the shaping grips. It is understood that while the shaping grips as described herein serve three functions, alternate embodiments could include two or even three devices that each provide a single function or two of the functions described for the shaping grips. The bundle can then be pushed from the shaping grips through a second curing station without tensioning the bundle.

It is a further embodiment of the disclosure that the bundle is pushed from the second curing station into a cutter and the bundle is cut into fragments of a specified length. A specified length can be any length appropriate for the intended use of the fibers. Appropriate lengths will vary depending on the intended use, but for concrete reinforcement, for example, the bundled fibers can be cut to lengths of from about 1 inch to about 5 inches, or from about 2 inches to about 4 inches, of about 1, about 2, about 3, about 4 or about 5 inches. The use of the term about is meant to convey that the length of cut of the bundled fibers can vary within a range of 10-20%, for example, or 10% in certain embodiments while still achieving the desired structural reinforcement properties.

In certain embodiments the resin is supplied to the impregnation device at a required viscosity by passing the resin through a viscosity stabilizer that is directly connected to a resin metering mixing device and fed into the resin impregnation device. The resin can be any suitable resin known in the art, and can be a thermoset resin or a thermoplastic resin for example. In certain embodiments the resin is a polyester, polyurethane, vinyl-ester or epoxy resin. In certain embodiments the bundle can be pulled into the first curing station and partially cured to achieve a viscosity of about $10^6$ Pa*S. It is a further aspect of the disclosure that the shaping grips imprint or impart a shape to the bundle and that the shape can be a wave pattern and can be an S curve wave pattern, or a square wave pattern. The pattern can also be an angular wave or other patterns that would occur to those in the art.

It is an aspect of the disclosure that the composite fibers produced according to the disclosure preferably include basalt fibers, or are substantially all basalt fibers and exhibit an intrabatch tensile strength with a variation of less than 30%, or 20% or less, or 10% or less, or 5% or less, or no more than 2%, 3% or 4%, and can exhibit an average tensile strength of about 419 ksi, in certain embodiments. It is understood of course, that the exemplary tensile strength is representative of a material that is useful for concrete reinforcement, but tensile strength will depend on many factors, primary of which is the composition of the starting material for the fibers themselves in addition to any of the steps in the pultruding process. The tensile strength can thus be adjusted according to the intended use of the fibers.

In certain embodiments the fragments are cut to a length for use in reinforcing concretes, mortars, soil stabilizing polymers, geo-polymers, or asphalts.

Certain aspects of the disclosure also include composite fibers made by the disclosed process, where those fibers are cut to a specified length for reinforcement in various materials, including but not limited to concrete, mortar, soil stabilizing polymer, geo-polymer, or asphalt and can further include such materials that are reinforced with the disclosed composite fibers.

DETAILED DESCRIPTION

Figure 3A:
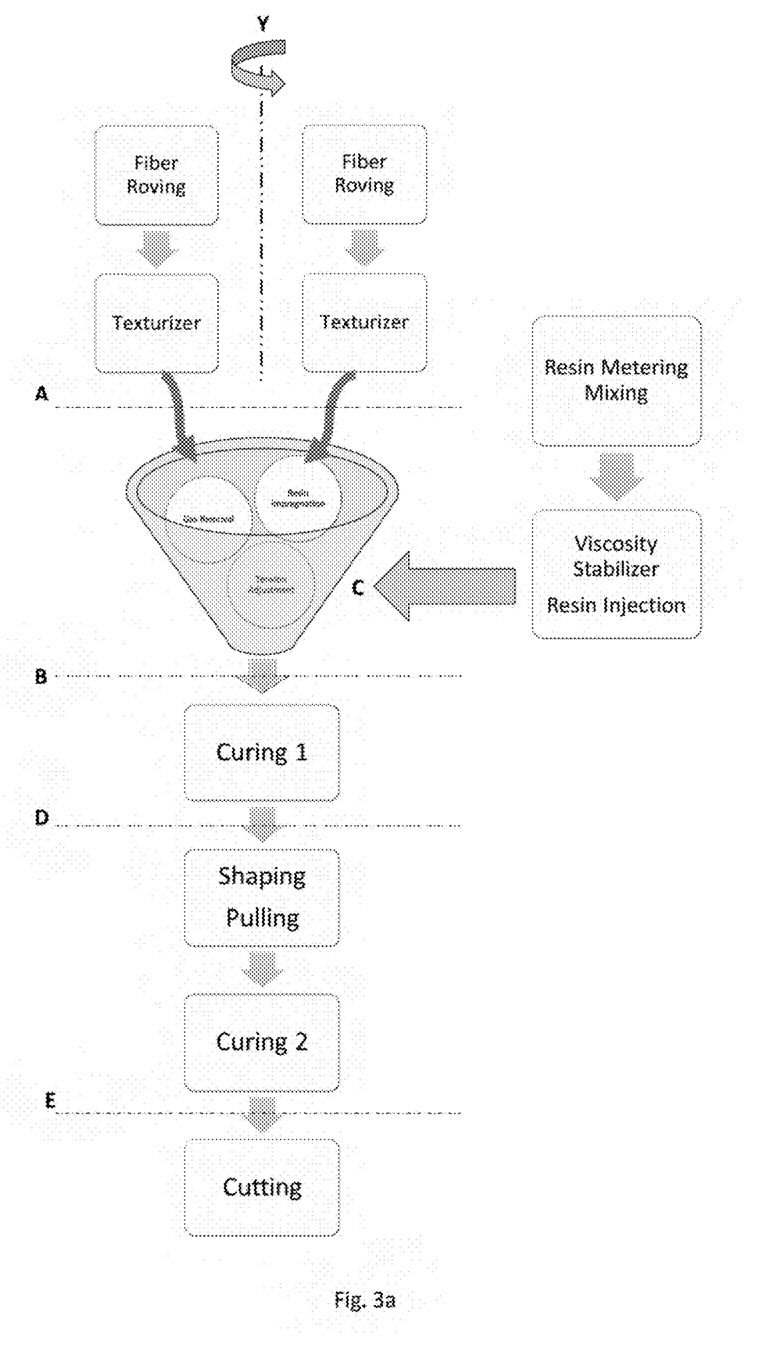
FIG. 3A is a flow diagram of an embodiment of a pultrusion process according to the current disclosure.
Figure 3B:
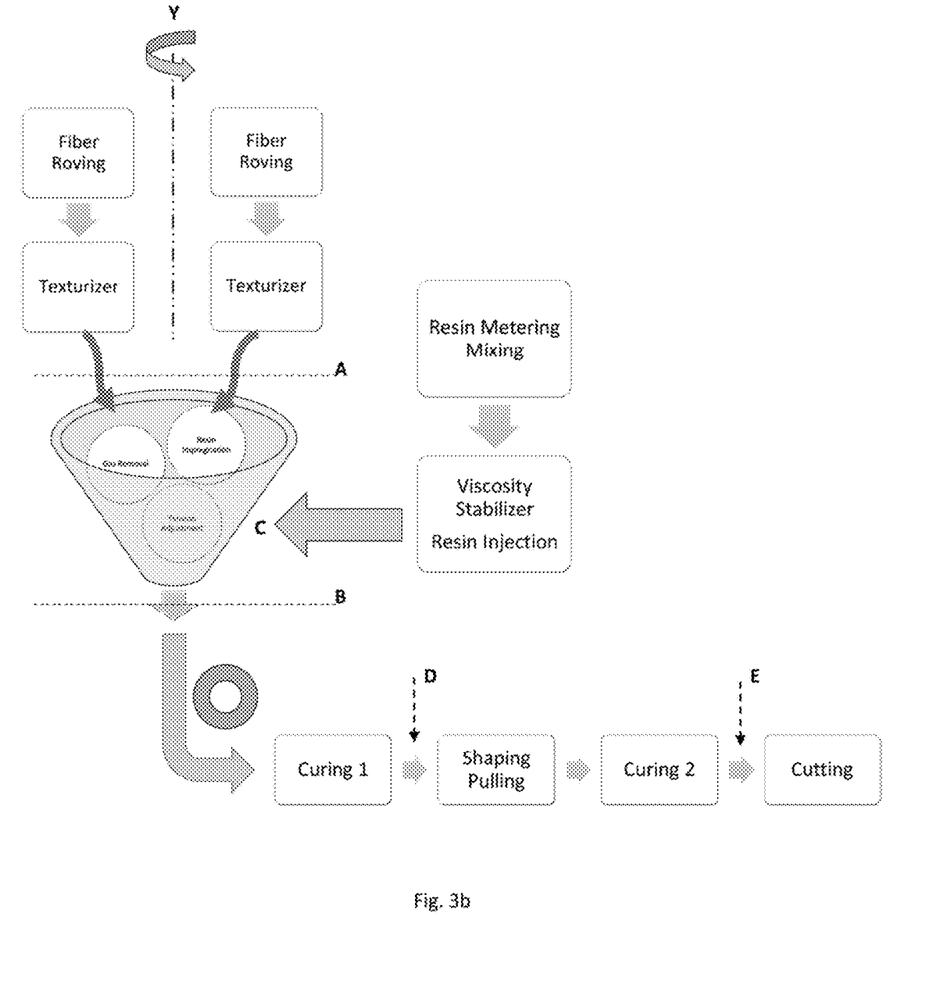
FIG. 3B is a flow diagram of an embodiment of a second pultrusion process according to the current disclosure.

Process flow diagrams for the practice of embodiments of the disclosure are shown in FIGS. 3A and 3B. The process is similar to conventional pultrusion in that it is a continuous process for manufacturing a composite with a constant cross-section, but the process is improved and is effective to produce fibers with increased structural strength and consistency as compared to conventionally produced fibers. At least one difference in the disclosed methods and apparatus is that while conventional pultrusion processes and machines are completely horizontal, the disclosed improvements include solutions to the gas bubble problem that include at least in part, orienting at least part of the process vertically. Another aspect of the disclosure is that resin viscosity and fiber tension can be precisely controlled.

FIG. 3A illustrates an embodiment of the novel processes. As a first step, fiber strands from a roving spool (preferably with internal unwinding) are fed vertically down through a texturizer that separates individual filaments of the strand, to prevent their sticking together. As shown in FIG. 3A, the process can typically include two or more roving spools and texturizers. It is understood that the term vertical can include some variance from absolutely perpendicular to the horizontal plane, but that the fiber strands are texturized and coated with resin at a substantially vertical angle and at an angle that is effective to release entrapped microbubbles from the filaments and to allow the gas to rise to the surface of the resin. At level A of the process as shown in FIG. 3A, the texturized strands are tension free (unstrained).

At the next stage, shown as level B in FIG. 3A, two or more texturized fiber strands are fed down through a "resin impregnation gas removal tension adjustment" device. The resin injector injects resin into the device and saturates the texturized fibers with the resin previously prepared by metering mixing equipment. The viscosity of the resin injected into the resin impregnation device (Point "C") does not exceed 5 mPa*S. The required viscosity is provided by a viscosity stabilizer that is directly connected to a resin metering mixing device.

During this process any previously trapped gases naturally surface. All the "Roving Spool-Texturizer" pairs are rotated around an axis Y twisting all the strands into a single bundle. The twisting point is below the resin level inside the device. Rotation can be chosen to provide 5 to 25 plies per inch. This arrangement improves the structural strength of the final product and improves gas removal from the "fiber-resin" bond.

After complete saturation, gas removal and twisting, the bundle is pulled through tension rollers that remove excess resin before the bundle goes to a curing station. These rollers function as a tension buffer between unstrained fiber inside the "resin impregnation-gas removal device" and the pulling device. In certain embodiments rollers downstream of the resin impregnation device can provide some pulling force in addition to the force provided by the shaping grips adapted so the bundle is under less stress. At the level shown as "B" of FIG. 3A the bundle of strands is twisted, impregnated with resin, free from gases, strained and uncured.

The bundle is subsequently pulled through curing station 1. It is understood that the curing stations are described herein primarily as heat curing stations, which are appropriate for thermoset resins such as polyurethanes, for example. It is understood, however, that in certain embodiments thermoset resins can be used and would require cooling curing stations. At the point shown as "D" in FIG. 3A, the resin is partially cured and has a viscosity of around $10^6$ Pa*S. The bundle then goes through shaping grips that provide a triple function "pull-shape-push". The process can be adapted such that the bundles are pushed from the shaping grips resulting in there being no tension after the bundle leaves the shaping zone to ensure that the desired shape of the bundle is not distorted. After the shaping zone, the bundle is pushed through curing station 2. At the end of the second curing the shaped bundle is completely polymerized, solidified, free from irregularities and shaped. The bundle can them be pushed into a cutter that cuts the continuous composite fibers into pieces of the required length. The process shown in FIG. 3B differs from that in FIG. 3A in that the bundle is rolled to a horizontal position for the steps of first curing, shaping, second curing and cutting.

Apparatus

Figure 4:
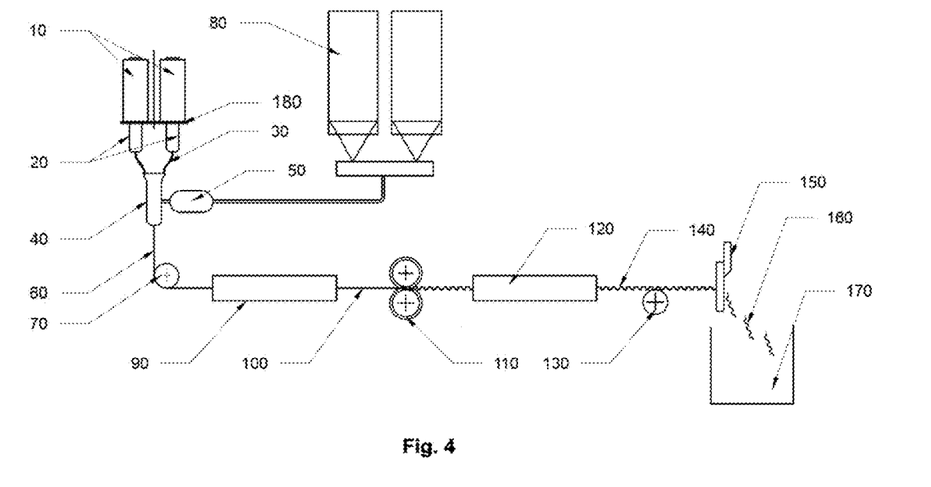
FIG. 4 is a diagram of an embodiment of an apparatus according to the current disclosure.

An embodiment of an apparatus for making composite structural reinforcement fibers is presented in FIG. 4. The apparatus includes two internal unwinding fiber roving bobbins (10) located on a rotating table (180). Two compressed air blower texturizers (20) are attached under the table (180). In this configuration the fibers are fed downward through the air jet texturizer devices (20) and into a resin impregnator (40) with squeezing rollers inside. The resin is prepared in a resin metering-mixing device (80), that feeds into a resin injector with a resin viscosity stabilizer (50). A fiber bundle tensioning roller (70) is adapted to function as a tension buffer between unstrained fibers inside the "resin impregnation gas removal device" (40) and the pulling device (110). The bundle is pulled into a first tunnel curing station (90), through shaping pull-push gears (110), through a second tunnel curing station (120), over support roller (130), and into the cutter (150), where specified lengths of fibers (160) are cut and dropped into a bunker (170).

In FIG. 4, the fibers as shown at point (30) are texturized, unsaturated, tension free fiber strands. At point (60) the fibers are a resin saturated, gas free, twisted, and non-cured bundle. At point (100) the bundle is half cured unshaped continuous composite fiber. At point (140) the bundle is completely cured, shaped, gas free, continuous fibers. Part (160) is a final product that is a cut to length composite structural reinforcement fiber.

Results

Figure 5:
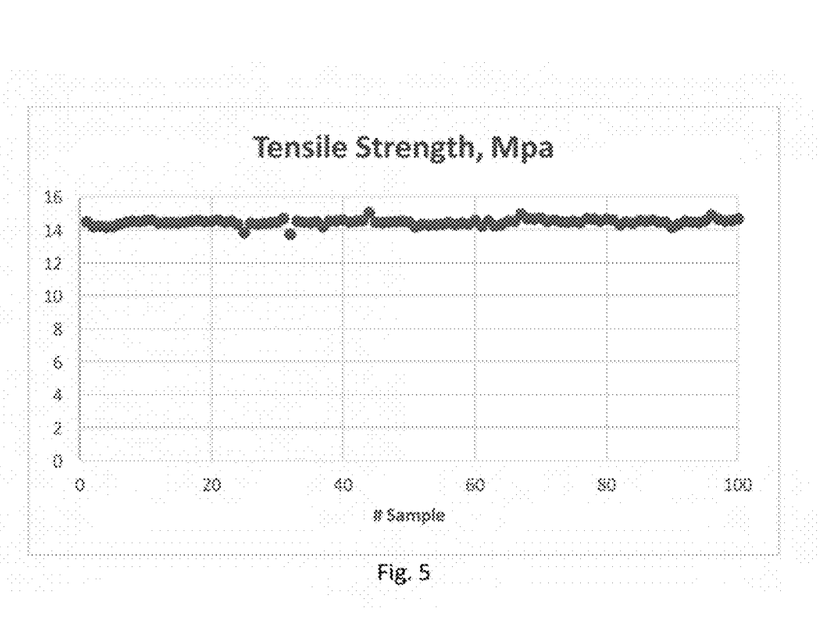
FIG. 5 is a graph of tensile strength of 100 samples of pultruded basalt fiber from a single batch according to the disclosure.

Tensile testing of composite fibers made in accordance with the present disclosure showed that a hundred samples from the same batch had an average tensile strength of around 419.18 ksi with a variation of about 5% above and below the average line as shown in FIG. 5. This result is an almost 60% improvement over fibers made with conventional pultrusion (compare to FIG. 1B). The study of shape, size, texture and phase distribution of composite fibers made in accordance with the disclosed process shows that there are almost no gas microbubbles between filaments inside the set resin.

The average residual strength of a concrete slab (standard 4500 psi concrete) reinforced with fibers produced by the disclosed process (mix ratio of 12 pounds of fiber per 1 cubic meter of concrete) is 3,176 psi, which is about 50% better than conventionally produced fibers. The average flexural strength of the same type of slab without fiber reinforcement is 2,740 psi.

All of the apparatus, components and methods disclosed and claimed herein can be made and used without undue experimentation in light of the present disclosure. While the apparatus, components and methods of this invention have been described in terms of preferred embodiments, it will be apparent to those of skill in the art that variations may be applied to the construction or components described herein without departing from the concept, spirit and scope of the invention. All such similar substitutes and modifications apparent to those skilled in the art are deemed to be within the spirit, scope and concept of the invention as defined by the appended claims.

The invention claimed is:

1. A method of producing composite fibers, said method comprising:
   feeding a plurality of fiber strands vertically down through a texturizer to obtain texturized fibers, wherein the texturized fibers are unstrained;
   vertically feeding the texturized fibers down through an injection device;
   injecting resin into the injection device at a viscosity of 5 mPa*S or less;
   rotating the plurality of fibers in the injection device, effective to twist the fibers into a bundle where the twisting point is below the level of resin in the injection device while allowing at least a portion of any trapped gases to rise to the surface of the resin;
   squeezing the twisted bundle with squeezing rollers inside the injection device effective to further release any trapped gases to rise to the surface of the resin;
   removing the bundle from the bottom of the device by pulling the bundle;
   pulling the bundle into a first curing station;
   pulling the bundle through shaping grips in which the shaping grips are adapted to:
      (i) pull the bundle from the first curing station,
      (ii) impart a shape to the bundle and
      (iii) push the bundle without tension out of the shaping grips, and
   pushing the bundle from the shaping grips through a second curing station without tensioning the bundle.

2. The method of claim wherein the plurality of fibers are fed into two or more texturizers from two or more roving spools.

3. The method of claim 1, further comprising the step of pushing the bundle from the second curing station to a cutter and cutting the bundle into fragments of a specified length.

4. The method of claim 1, wherein the bundle is rotated in the device effective to achieve a configuration of from about 5 to about 25 plies per inch.

5. The method of claim 1, wherein the resin is supplied to the device at required viscosity by passing the resin through a viscosity stabilizer that is directly connected to a resin metering mixing device.

6. The method of claim 1, wherein the bundle is partially cured in the first curing station to achieve a viscosity of about 106 Pa*S.

7. The method of claim 1, wherein the shaping grips impart a wave structure to the bundle.

8. The method of claim 1, wherein the shaping grips impart a square wave structure to the bundle.

9. The method of claim 3, wherein the fragments are cut to a length for use in reinforcing concretes, mortars, soil stabilizing polymers, geo-polymers, asphalts or a combination thereof.

10. The method of claim 1, wherein the fibers comprise igneous rock fibers, carbon fibers, arm d, para-aramid or meta-aramid fibers or glass fibers.

11. The method of claim 1, wherein the fibers comprise igneous rock fibers selected from feldspars, quartz, feldspathoids, olivines, pyroxenes, amphiboles, micas and combinations thereof.

12. The method of claim 1, wherein the fibers comprise basalt fibers.

13. The method of claim 1, wherein the fibers exhibit an intrabatch tensile strength with a variation of no more than 5% from the median.

14. A method of producing composite fibers, the method comprising:
   feeding a plurality of fiber strands through a texturizer to obtain texturized fibers, wherein the texturized fibers are unstrained;
   vertically feeding the texturized fibers down through an injection device;
   injecting resin into the injection device at a viscosity of 5 mPa*S or less;
   rotating the plurality of fibers in the injection device to twist the fibers into a bundle, wherein the bundle is below the level of resin in the injection device, and wherein at least a portion of trapped gases rise to the surface of the resin;
   squeezing the bundle with squeezing rollers inside the injection device, wherein the trapped gases rise to the surface of the resin;
   removing, the bundle from the bottom of the device by pulling the bundle;
   pulling the bundle into a first curing station;
   pulling the bundle through shaping grips, wherein the shaping grips are adapted to:
      (i) pull the bundle from the first curing station,
      (ii) impart a shape to the bundle, and
      (iii) push the bundle without tension out of the shaping grips;
   pushing the bundle from the shaping grips through a second curing station without tensioning the bundle;
   pushing the bundle from the second curing station to a cutter; and
   cutting the bundle into fragments of a specified length using the cutter.

15. The method of claim 14, wherein feeding the plurality of fiber strands through the texturizer further comprises:
   feeding the plurality of fibers respectively into two or more texturizers from two or more roving, spools.

16. The method of claim 14, wherein rotating the plurality of fibers in the injection device to twist the fibers into the bundle further comprises:
   rotating the bundle in the device to provide from 5 to 25 fiber strands per inch.

17. The method of claim 14, wherein injecting resin into the injection device further comprises:
   passing the resin through a viscosity stabilizer that is coupled to a resin metering mixing device.

18. The method of claim 14, further comprising:
   partially curing the bundle in the first curing station to achieve a viscosity of about 106 Pa*S.

19. The method of claim 14, wherein the shaping grips adapted to impart a shape to the bundle further comprise:
the shaping grips adapted to impart a wave structure to the bundle.

20. The method of claim 19, wherein wave structure is a square wave structure.

21. The method of claim 14, wherein cutting the bundle into fragments of a specified length further comprises:
cutting, the fragments to a length for use in at least one of:
reinforcing concretes, mortars, soil stabilizing polymers, geo-polymers, or asphalts.

22. The method of claim 14, wherein the fiber strands comprise at least one of: igneous rock fibers, carbon fibers, aramid fibers, para-aramid fibers, meta-aramid fibers, or glass fibers.

23. The method of claim 14, herein the fiber strands comprise igneous rock fibers formed from an igneous rock selected from at least one of: feldspar, quartz, feldspathoid, olivine, pyroxene, amphibole, or mica.

24. The method of claim 14, wherein the fiber strands comprise basalt fibers.

25. The method of claim 14, wherein the composite fibers in the fragments exhibit a tensile strength with a variance of less than 5% from a median tensile strength across different batches of the fragments.

26. The method of claim 14, further comprising:
stabilizing the resin in a resin stabilizer.

27. The method of claim 26, wherein the resin stabilizer is in fluid communication with the injection device.

28. The method of claim 14, wherein removing the bindle from the bottom of the device by pulling the bundle further comprises:
pulling the bundle using tensioning rollers.

29. The method of claim 14, further comprising:
at least partically curing the resin at the first curing station.

* * * * *

UNITED STATES PATENT AND TRADEMARK OFFICE
CERTIFICATE OF CORRECTION

| | |
|---|---|
| PATENT NO. | : 10,369,754 B2 |
| APPLICATION NO. | : 15/424538 |
| DATED | : August 6, 2019 |
| INVENTOR(S) | : Oleksandr Biland and Robert Bruce Ferguson, Sr. |

It is certified that error appears in the above-identified patent and that said Letters Patent is hereby corrected as shown below:

On the Title Page

Item (72), CORRECT THE SECOND INVENTOR'S NAME FROM ROBERT FERGUSON TO ROBERT BRUCE FERGUSON, SR.

Signed and Sealed this
Fourteenth Day of February, 2023

Katherine Kelly Vidal
*Director of the United States Patent and Trademark Office*